(12) United States Patent
Casas Chiné et al.

(10) Patent No.: US 11,369,115 B2
(45) Date of Patent: Jun. 28, 2022

(54) LIQUID FORMULATION BASED ON CUO NANOPARTICLES TO BOOST THE SELF-DEFENCE OF PLANTS AND USE OF SAME

(71) Applicant: AGROSTOCK, S.A., Fraga (ES)

(72) Inventors: Jorge Casas Chiné, Fraga (ES); Jose Luis Ordoñez Ramos, Fraga (ES); Ernesto Francisco Simó Alfonso, Burjassot (ES); Enrique Javier Carrasco Correa, Burjassot (ES)

(73) Assignee: AGROSTOCK, S.A., Huesca (ES)

( * ) Notice: Subject to any disclaimer, the term of this patent is extended or adjusted under 35 U.S.C. 154(b) by 0 days.

(21) Appl. No.: 16/969,608

(22) PCT Filed: Mar. 12, 2018

(86) PCT No.: PCT/ES2018/070181
§ 371 (c)(1),
(2) Date: Aug. 13, 2020

(87) PCT Pub. No.: WO2019/158786
PCT Pub. Date: Aug. 22, 2019

(65) Prior Publication Data
US 2021/0015104 A1    Jan. 21, 2021

(30) Foreign Application Priority Data

Feb. 19, 2018 (ES) .............. ESP201830145

(51) Int. Cl.
*A01N 59/20* (2006.01)
*A01N 25/08* (2006.01)

(52) U.S. Cl.
CPC ............. *A01N 59/20* (2013.01); *A01N 25/08* (2013.01)

(58) Field of Classification Search
CPC ..................................................... A01N 59/20
See application file for complete search history.

(56) References Cited

U.S. PATENT DOCUMENTS

2015/0246853 A1 *   9/2015   Pardo Miro ......... A01G 25/023
239/1

OTHER PUBLICATIONS

Siddiqi et al. Nanoscale Research Letters, 2017, 12:92, 18 pgs.*

* cited by examiner

*Primary Examiner* — Kyle A Purdy
(74) *Attorney, Agent, or Firm* — The Morales Law Firm; Joseph L. Morales

(57) ABSTRACT

A liquid formulation is described for the treatment of wood in plants such as vines, almond trees and the like, to enhance self-defences and resistance of the plant against fungal diseases. The formulation consists in a compound made from copper, essential plant amino acids, menadione sodium bisulphite and water, where the copper is incorporated in the form of nanoparticles with a size under 60 nm, and in a proportion of less than 1.0% by weight. The application of the formulation allows incorporation thereof in different fertiliser irrigation methods, or via the leaves with a spraying device.

20 Claims, 5 Drawing Sheets

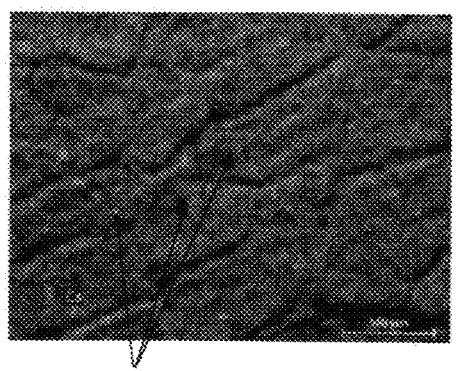
Fig. 1.1 – Cu nanoparticles
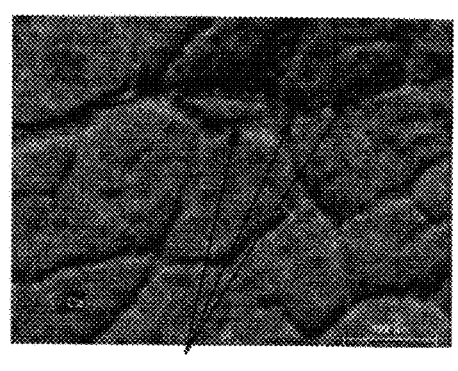
Fig. 1.2 – Cu in mineral form

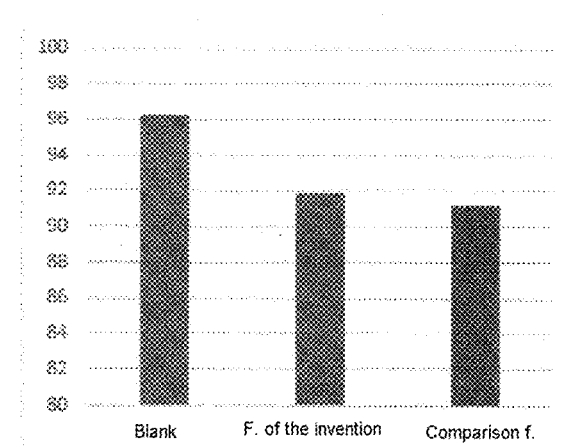
Percentage of plants presenting any symptom.
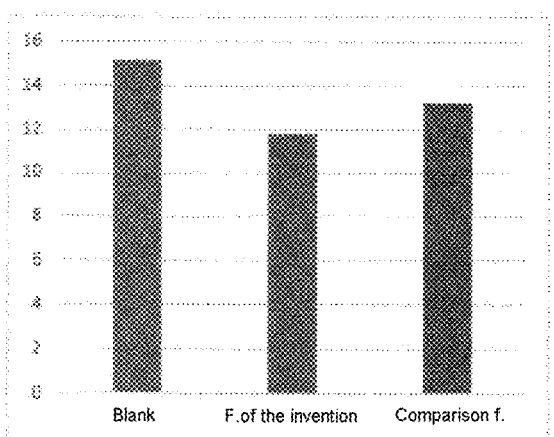
Percentage of leaves affected per plant.
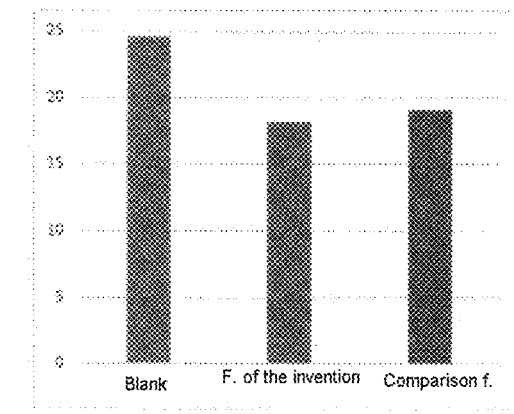
Percentage affection in all of the leaves affected.
Fig. 5

LIQUID FORMULATION BASED ON CUO NANOPARTICLES TO BOOST THE SELF-DEFENCE OF PLANTS AND USE OF SAME

TECHNICAL FIELD OF THE INVENTION

The present invention relates to a liquid formulation based on copper oxide (CuO) nanoparticles as a plant self-defences enhancer. The invention also relates to the use of said formulation in the defence of plants and trees such as vines, almond trees and the like against certain pathogens that cause fungal wood diseases in the wood of such plants.

The present invention belongs to the technical field of the industry dedicated to manufacturing and applying fertilisers and other products to enhance and promote the self-defences of trees and plants.

BACKGROUND OF THE INVENTION

Fungal wood diseases (FWD) affect all large vine growing areas worldwide. Currently, FWD constitute the main concern of the wine growing sector with regard to plant health. In Spain it is estimated that 50% of vineyards have a plant affected by FWD. There are no fungicides nor any other control strategies that achieve complete eradication of the pathogens. The losses caused are so great that the term "21st Century Phylloxera" is already being used.

Traditionally, these diseases were generally treated with certain compounds based on copper metal. One example of a compound for the treatment of these diseases in vine wood is described in patent document P-201700511 of the same applicant, which claims a liquid formulation obtained by mixing sodium lignosulphonate (from 10% to 15% by weight), copper sulphate (from 15% to 25% by weight), a water soluble addition compound of vitamin group K (mentioned as MSB, in a percentage from 0.20% to 0.40% by weight), and free plant origin amino acids (from 1.30 to 1.75% by weight), the rest being water until reaching 100% by weight. The application of this formulation to vines has allowed improving metabolic processes that take place in the various development stages, improving the appearance of treated plants, activating their self-defences and resistance against biotic and abiotic adverse conditions, thereby allowing to increase the yield and production of the harvests.

As it is known, unlike other fungal diseases such as mildew (caused by *Plasmopara viticola*), oidium (caused by *Uncinula necátor*) or botrytis (caused by *Botrytis cinerea*), wood diseases are pluriannual and are caused by over 100 different species of fungi associated with a variety of symptoms. Pathogenic fungi infect wood and grow internally in the trunk and branches, causing necrosis and/or rotting of the wood. In the case of vines, diseased vines show increasing loss of vigour, reducing the amount and quality of the harvest in successive years. In all cases, as a result of the fungal infection there is an increasing weakening and the plants eventually die, making it necessary to replace the vineyard with the resulting economic consequences.

Although the behaviour of the formulation described in the aforementioned patent document has allowed improving the response of the plants to which it is applied, continued research conducted by the inventors has allowed formulating a new composition that increases the self-defences and resistance of the plant, has economic advantages with respect to product costs, and especially has a much less invasive behaviour for the environment than other formulations of the prior art.

In this sense, as persons skilled in the art are aware, copper has the effect on plants of activating certain enzymes involved in the synthesis of lignin and is essential in certain enzymatic systems. It is also necessary in the process of photosynthesis, is essential to plant respiration and is a coadjuvant thereof in the metabolism of carbohydrates and proteins, as well as intensifying flavour and colour in vegetables and flowers.

When there is a copper deficiency the symptoms of this deficiency can be seen in new leaves, and depend on each crop, leading to rolling and slight chlorosis in the entire leaf or in the veins of new leaves.

It is therefore clear that copper is a necessary element for plants. However, it is often the case that the addition of this element to plants occurs in amounts that exceed allowed limits, generating toxicity that affects the development of the roots, burning their tips and leading to excessive lateral growth. It should also be considered that high copper levels in plants can compete with the absorption of other elements such as iron, molybdenum or zinc. In the case of new crops, they may become greener than normal, then show symptoms of iron deficiency and probably of other micronutrients, and if not corrected in time copper toxicity can reduce branching and eventually lead to a deterioration of the plant.

In view of the foregoing it is understood that there is a need in the art for a formulation that when applied to plants allows a normal development and behaviour thereof, in their trunk, branches and leaves, and at a reticular level, in which the copper content is as low as possible, ensuring a sufficient contribution to enhance self-defences and resistance of the plant without risk to the environment.

BRIEF DESCRIPTION OF THE DRAWINGS

The above and other features, aspects, and advantages of the present invention are considered in more detail, in relation to the following description of embodiments thereof shown in the accompanying drawings, in which:

FIGS. 1.1 AND 1.2 are microphotographs showing how the copper from the formulation of the present invention is dispersed.

FIG. 5 shows a comparison of the effect of the formulation.

DESCRIPTION OF THE INVENTION

Figure 2:
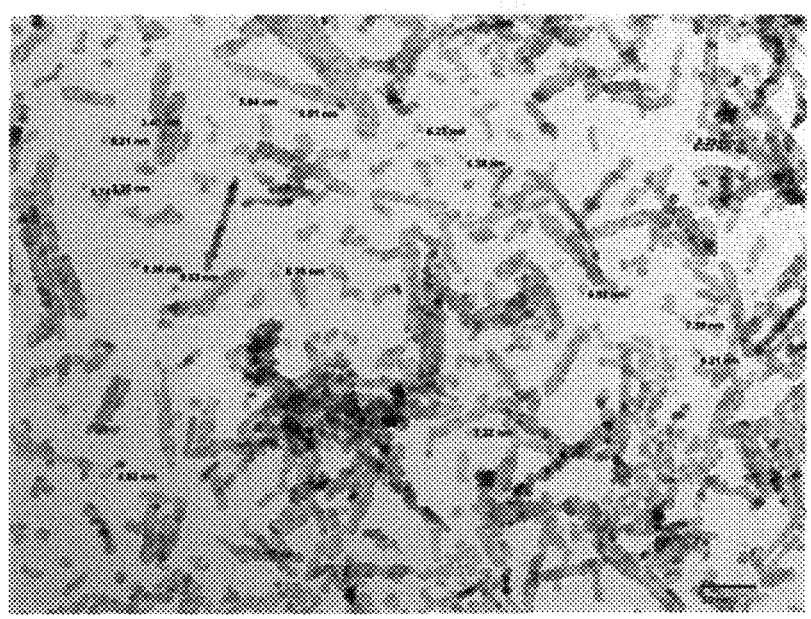
FIG. 2 shows a micrograph made with a transmission electron microscope that shows the size of the particles and their aggregation.

The liquid formulation of the of the present invention has been developed considering the needs of the current art as mentioned above. In this regard, the present invention relates to a liquid formulation based on CuO nanoparticles in the form of copper oxide (CuO) nanoparticles, as a plant self-defences enhancer and intended to improve the physiological efficiency thereof. More particularly, the invention relates to a liquid formulation that allows reducing the incidence and severity of the symptoms of diseases in plants, particularly wood diseases (inhibiting the action of certain pathogens) and fungal diseases such as mildew, while at the same time reducing transpiration and achieving a greater net photosynthesis. Similarly, one of the essential features of the present formulation is its low copper concentration, which makes it substantially environmentally friendly.

The use of the formulation of the invention allows improving the metabolic processes that take place in the various development stages, improving the appearance of treated plants, activating their self-defences and resistance against biotic and abiotic adverse conditions, thereby allowing to increase the yield and production of the harvests. For this purpose, the formulation of the present invention comprises copper, essential plant amino acids, and a derivative of vitamin K (MSB, menadione sodium bisulphite or vitamin K3), such that the copper is incorporated in the form of nanoparticles, in this way multiplying the protective surface of the treatments while ensuring improved adherence and persistence of the copper on the plant tissues, thereby increasing crop protection times. This composition also allows the formulation of the invention to act as a stimulant for various metabolic reactions of plants that are essential for their development and growth.

In the agricultural sector, nanotechnology can offer nanomaterials that act as elicitors for plants, as well as other functions. An elicitor is defined as a compound that when applied exogenously can activate or deactivate the natural synthesis of other substances in the plant, stimulating metabolism and activating the defensive response of the plant. In addition to that, the nanomaterials can act as more effective nutrients or pesticides with fewer secondary effects and improved efficacy.

These novel fertilisers, unlike the products currently available in the market, have an enhancing effect as the presence thereof in the composition: I) favours the assimilation of nutrients and prevents contamination and degradation of soil and water basins; II) improves the overall state of the crop via metabolic activation and/or otherwise, resulting in greater production and higher quality; III) stimulates the natural defences of the plant reducing the use of fungicides; IV) reduces the amount of raw materials needed increasing the effectiveness of crop fertilisation, thereby preventing eutrophisation problems in adjacent areas; V) reduces costs; and VI) improves the quality of the fruit both before and after harvesting (Biswal S K, Nayak A K, Parida U K, Nayak P L, Applications of nanotechnology in agriculture and food sciences. IJSID. 2012;2(1):21-36).

As it is known, the substance known as MSB in the present description, together with various metal cations in the same formulation such as Ca, Zn, Mn and of course Cu, improves the assimilation of these metals (and their corresponding oxides) by the plant. Thus, the formulation is applied through the roots, stimulating the formation of new roots that are those most effective in absorbing these high atomic weight metals and transported through the xylem (upward system) while in foliar application it improves the absorption metabolism to the phloem.

An important finding of the present invention is that in the proposed formulation, the joint effects of the amino acids, which increase penetration in the plant of the entire molecule accompanying these, together with the "carrier" effect of the MSB on the cations, ensures guaranteeing the penetration of the copper oxide (CuO) nanoparticles. Thus, thanks to the general improvement associated with the MSB, the circulation of the CuO nanoparticles in the sap of the plant, in both the phloem and xylem, is enhanced, thereby guaranteeing that the nanoparticles reach all the parts of the crop.

According to the invention, the liquid formulation proposed responds to the following qualitative and quantitative composition:

| | |
|---|---|
| Copper (in nanoparticles) | 0.1%-1.0% (by weight) |
| Essential plant amino acids | 10%-25% (by weight) |
| Menadione sodium bisulphite (Vitamin K3) | 0.2%-0.4% (by weight) |
| Water | Remainder up to 100% by weight |

Preferably, the size of the CuO nanoparticles participating in the liquid formulation of the present invention is under 60 nm, and more preferably it is in the range from 8 nm to 40 nm.

The greater efficiency of CuO nanoparticles with respect to other copper forms is mainly due to the small size of this format, since this allows on one hand a greater dispersion of said particles on the leaves and fruit and, on the other, favours absorption.

The above can be seen in FIGS. 1.1 and 1.2, which are microphotographs showing how the copper from the formulation of the present invention is dispersed on the surface of a leaf (FIG. 1.1) compared to dispersion of copper from a conventional formulation (FIG. 1.2).

It should be noted that the microphotographs of the mapping of the elements on the leaf show that for the CuO nanoparticles of the invention the points (Cu) are distributed randomly, while with the commercially available formulation the Cu is grouped in intercellular areas instead of being distributed inside the cells. This confirms the above reference to a greater dispersion of the nanoparticles. The molecules themselves are nanometric in size, but by inertia in nature tend to group in agglomerates, considerably increasing their size, so that they are not considered nanoparticles. The formulation of the invention allows obtaining CuO nanoparticles with a size from 8 to 40 nm that do not tend to agglomerate, thereby increasing their effectiveness. FIG. 2 shows an example of a microphotograph made with a transmission electron microscope that shows the size of the particles and their aggregation.

As mentioned before, copper is necessary in the process of photosynthesis, as it is essential in plant respiration and forms part of the prosthetic group of numerous proteins, such as oxidases of ascorbic acid, phenol or cytochrome. It enhances the use of nitrogen and protein synthesis and acts as a stabiliser of chlorophyll, helping to intensity the colour and flavour of vegetable and flowers. Although it is an essential element, copper is also considered to be a heavy metal that can accumulate in the soil, and is scarcely biodegradable. This entails a risk as at an acidic pH copper becomes more soluble and can therefore be toxic to auxiliary fauna. For this reason, as explained above, the liquid formulation of the invention combines the advantage provided by the small size of the CuO nanoparticles, with the carrier effect provided by the MSB and the complexing power of essential plant amino acids, thereby facilitating the absorption by the plant of the supplied copper. It also results in a greater mobilisation of the copper in the plant, allowing its assimilation in a quick, effective and abundant manner, and allowing it to reach the place where it must act. In this way the metabolic processes that occur in the various development stages of plants are optimised, activating their self-defences and the resistance against adverse biotic and abiotic conditions, thereby allowing to increase yield and production of the crops. At the same time, as a small amount of copper is used the accumulation in the soil of this metal can be reduced, contributing to reduction in environmental impact.

In a preferred use of the formulation of the invention, it is incorporated in the soil by fertiliser irrigation, drip irrigation, sprinklers, distributing it in areas near the plant in surface flooding, spraying, application with a spray nozzle, in the initial stages of the crop development to promote formation of new roots. The dose of the formulation of the invention to use is 2.5 liters per hectare of crop and application.

EXAMPLE 1

A test is performed of the formulation of the invention to evaluate its effect on vine wood diseases (VWD). For a more rigorous understanding of the response of vine plants infected with the fungi causing VWD and treated with the various products developed, an experimental vineyard was implanted with 36 young vines in pots. The test was performed during the 2017 season in the facilities of VITEC. The evaluation of the formulation of the invention compared to a commercial formulation yielded the following results:
PRODUCT 1=Comparison formulation
PRODUCT 2=Invention formulation The 36 plants were arranged in a pattern of 2 repetition blocks. Each experimental unit was formed by 3 plants considered biological replicas, for a total of 6 vines per condition. The test compared 6 different conditions, as described below.
1. CONTROL WITHOUT FUNGUS+NO PRODUCT [0+C]
2. CONTROL CON HONGO+NO PRODUCT [0+HH]
3. CONTROL WITHOUT FUNGUS+PRODUCT 1 [1+C]
4. CONTROL WITHOUT FUNGUS+PRODUCT 2 [2+C]
5. PRODUCT 1+2 FUNGI [1+HH]
6. PRODUCT 2+2 FUNGI [2+HH]

For each condition, 6 plants were analysed (6×6=36 plants). The water and nutritional supply of the vineyard of the study were controlled. The necessary wine growing checks were performed periodically to maintain the plants in optimal growth conditions and prevent abiotic stress conditions.

When the first leaves had grown the first treatment of the tested products was applied. Two weeks later the inoculations were performed, infecting the plants with the agents responsible for the VWD selected. After two weeks the second treatment was applied with the tested products and the plants were then kept for 3 additional months until uprooting to evaluate susceptibility and reisolate the pathogenic fungi.
Treatments:

Two treatments were performed. The products were applied directly to each pot. To do so 250 mL of a previously prepared solution (1 mL of product+250 mL of distilled water/plant) were applied.
Inoculation:

Following the methodology described by Úrbez-Torres et al., 2014, the plants in conditions 3, 5 and 6 (named "+HH") were inoculated and infected with two fungal species responsible for VWD: *Diplodia seriata* (Ds) and *Phaeoacremonium minimum* (Pm). The inoculation method involved depositing a small square of the culture medium with the mycellium of the fresh and active fungus (7-10 days of growth), after making a cut in the plant with a sterile scalpel. The two fungi were inoculated together between the first and second buds. Then a cotton swab moistened in sterile water was placed and the wounds were sealed with parafilm.

In the plants in control conditions 1, 2 and 4 (named "+C"), not infected, a cut was also made placing a sterile agar piece and sealing with cotton and parafilm as described above.

The following results were obtained after evaluating the effectiveness of the various treatments:

TABLE 1.1

Percentage (%) inhibition for *D. seriata* in each of the areas
% percentage inhibition for *D. seriata*

| Area formulation of the invention | 12.5% |
|---|---|
| Area comparison formulation | 14% |
| Untreated area | 0% |

TABLE 1.2

Percentage (%) inhibition for *P. minimum* in each of the areas
% percentage inhibition for *P. minimum*

| Area formulation of the invention | 100% |
|---|---|
| Area comparison formulation | 9.2% |
| Untreated area | 9.2% |

As shown in table 1.1, in the areas treated with the formulation of the invention a reduction in the percentage of infection with pathogen *D. Seriata* of 12.5% was observed. However, of greater interest was the effect that the formulation of the invention showed for fungus *P. minimum*. Table 1.2 shows that the formulation of the invention can completely inhibit the action of this fungus.

Figure 3:
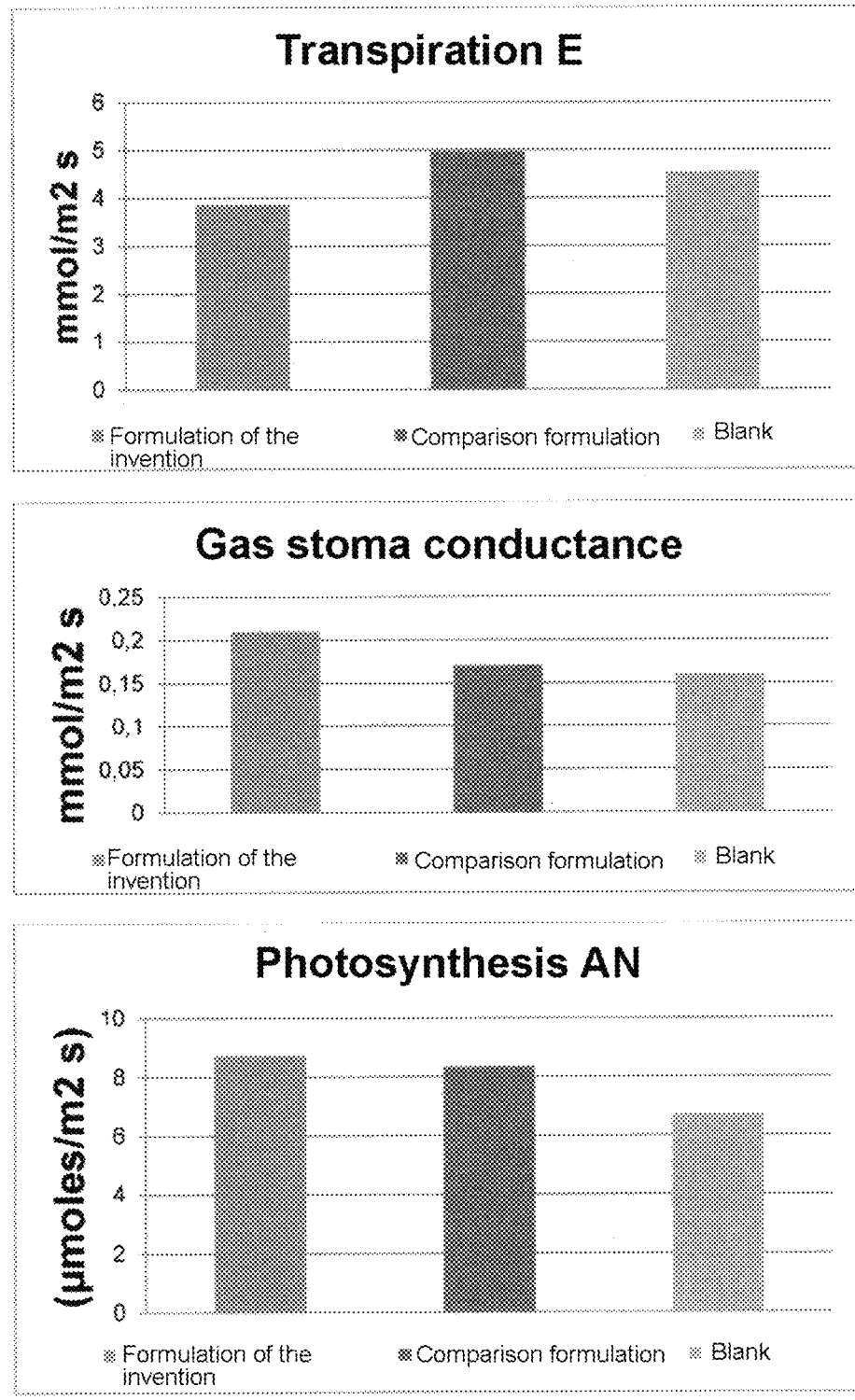
FIG. 3 shows the results of photosynthesis and transpiration values measured in the vineyard areas of the study.

With regard to abiotic stress in the symptomatic vines, FIG. 3 shows the results of the photosynthesis and transpiration values measured in the vineyard areas of the study. This figure shows that in the tested conditions the plants treated with the formulation of the invention presented reduced transpiration and greater net photosynthesis, which suggests an improved physiological efficiency.

EXAMPLE 2

Figure 4:
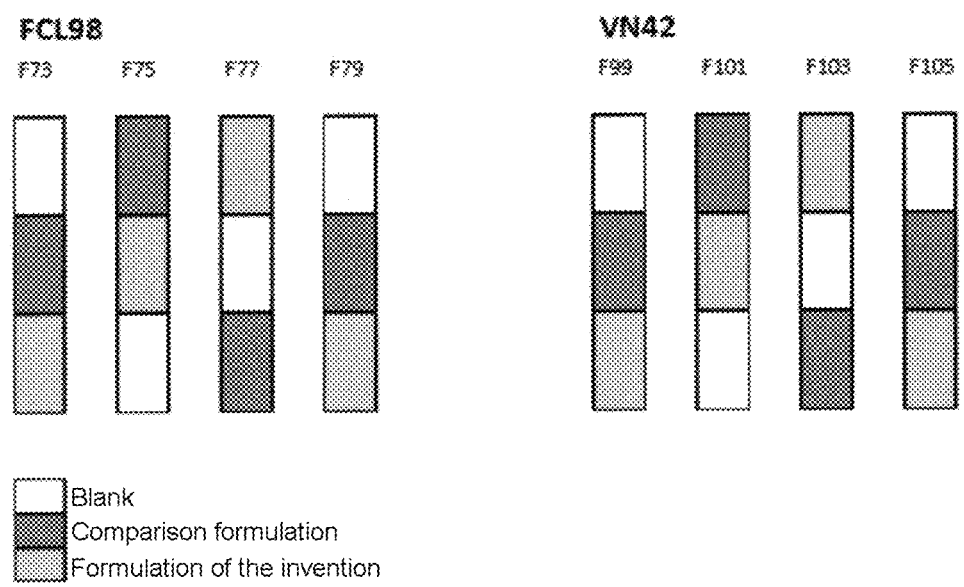
FIG. 4 shows a schematic representation of the effect of the formulation on mildew symptoms.

A test was performed of the formulation of the invention to evaluate its effect on mildew symptoms. Specifically, a test was performed with 2 plots corresponding to 2 different batches (FCL98 and VN42), in which 3 treatments were defined (blank, formulation of the invention and comparison formulation). This was repeated 4 times as indicated in the schematic representation of the test shown in FIG. 4 of the accompanying drawings. As a whole, the number of plants on which the copper treatments were performed was 1200 plants for each batch. The formulation of the invention was applied via leaves and the test was performed in the 2017 season by the University of Navarre.

To quantify the symptoms of mildew, 20 plants of each batch and repetition were selected at random, counting for each one:
Total no. of leaves per plant (healthy and affected)
Total number of leaves affected by mildew
% affection by mildew in the affected leaves
These data were used to calculate for each repetition:
Incidence:
1. No. of plants affected by mildew (presenting a symptom in any leaf)
2. % leaves affected
Severity: Average % affection in all of the leaves affected.
Mildew Incidence Results.

TABLE 1.3

Percentage (%) reduction in symptoms in plants in each of the areas
% percentage reduction of symptoms in plants

| | |
|---|---|
| Area formulation of the invention | 5% |
| Area comparison formulation | 5% |
| Untreated area | 0% |

TABLE 1.4

Percentage (%) reduction in number of leaves affected in each of the areas
% percentage reduction of number of leaves affected

| | |
|---|---|
| Area formulation of the invention | 21% |
| Area comparison formulation | 12% |
| Untreated area | 0% |

As shown in table 1.3, in the areas treated with the formulation of the invention and with the comparison formulation, the percentage of plants showing some symptom was slightly lower in the treated plants, with 5% less plants affected.

At the same time, table 1.4 shows that the number of leaves affected was clearly lower in the vines treated with the formulation of the invention (21% lower), while the treatment with the comparison formulation also reduced affectation, albeit somewhat less (12%).

Severity:
The percentage of the leaf surface affected was also reduced by the treatments, by 26% in the case of the formulation of the invention and by 22% in the comparison formulation, compared to the blank, as shown in the corresponding representations in FIG. 5 of the accompanying drawings.

INDUSTRIAL APPLICABILITY

As results from the above description of a preferred embodiment, the invention is particularly applicable in the sector of the industry dedicated to the manufacture and application of products for promoting and enhancing self-defences of trees and plants.

The invention claimed is:

1. A liquid formulation based on CuO nanoparticles as a plant self-defense enhancer, consisting of a liquid composition that comprises copper, essential plant amino acids, menadione sodium bisulphite (MSB, Vitamin K3) and water until completing 100% by weight of the composition, characterised in that copper is supplied to the composition in the form of CuO nanoparticles, with a resulting multiplication effect of the protective surface of the treatments and improved adherence and persistence of the copper on the plant tissues, with considerably increased time of protection, where the carrier effect provided by the MSB to the CuO nanoparticles promotes the penetration thereof, improving the overall metabolism of the plant.

2. The liquid formulation according to claim 1, characterised in that the percentage by weight of CuO nanoparticles in the composition is in a range between 0.1% and 1.0% by weight.

3. The liquid formulation according to claim 1, characterised in that the size of the CuO nanoparticles is selected within a range under 60 nm.

4. A method of using the liquid formulation of claim 1 as a plant self-defense enhancer to combat fungal wood diseases.

5. The method of claim 4, characterised in that in one form of use the liquid formulation is incorporated in the soil by fertiliser irrigation, drip irrigation, sprinklers, or by distributing it in areas near the plant by surface flooding.

6. The method of claim 4, characterised in that in one alternative form of use the incorporation is performed via the leaves, applying a spray, in the initial stages of development of the crop to stimulate the formation of new roots.

7. The method of claim 4, characterised in that said formulation is applied in doses on the order of 2.5 litres per hectare of crop and application.

8. A method of using the liquid formulation of claim 2 as a plant self-defense enhancer to combat fungal wood diseases.

9. A method of using the liquid formulation of claim 3 as a plant self-defense enhancer to combat fungal wood diseases.

10. The method of claim 8, characterised in that in one form of use the liquid formulation is incorporated in the soil by fertiliser irrigation, drip irrigation, sprinklers, or by distributing it in areas near the plant by surface flooding.

11. The method of claim 9, characterised in that in one form of use the liquid formulation is incorporated in the soil by fertilizer irrigation, drip irrigation, sprinklers, or by distributing it in areas near the plant by surface flooding.

12. The method of claim 8, characterised in that in one alternative form of use the incorporation is performed via the leaves, applying a spray, in the initial stages of development of the crop to stimulate the formation of new roots.

13. The method of claim 9, characterised in that in one alternative form of use the incorporation is performed via the leaves, applying a spray, in the initial stages of development of the crop to stimulate the formation of new roots.

14. The method of claim 5, characterised in that said formulation is applied in doses on the order of 2.5 liters per hectare of crop and application.

15. The method of claim 6, characterised in that said formulation is applied in doses on the order of 2.5 liters per hectare of crop and application.

16. The method of claim 7, characterised in that said formulation is applied in doses on the order of 2.5 liters per hectare of crop and application.

17. The method of claim 8, characterised in that said formulation is applied in doses on the order of 2.5 liters per hectare of crop and application.

18. The method of claim 9, characterised in that said formulation is applied in doses on the order of 2.5 liters per hectare of crop and application.

19. The method of claim 10, characterised in that said formulation is applied in doses on the order of 2.5 liters per hectare of crop and application.

20. The method of claim 11, characterised in that said formulation is applied in doses on the order of 2.5 liters per hectare of crop and application.

* * * * *